United States Patent [19]
Frantz

[11] Patent Number: 4,853,120
[45] Date of Patent: Aug. 1, 1989

[54] AXIAL REVERSE FLOW FILTER ASSEMBLY FOR FLUIDS

[76] Inventor: John M. Frantz, 12337 Delaware Rd., Hickman, Calif. 95323-9602

[21] Appl. No.: 194,035

[22] Filed: May 13, 1989

[51] Int. Cl.⁴ .......................................... B01D 46/00
[52] U.S. Cl. .................................. 210/184; 210/443; 210/439; 210/455; 210/440; 210/451
[58] Field of Search ............... 210/184, 232, 238, 443, 210/439, 455, 484, 249, 440, 451, 453

[56] References Cited

U.S. PATENT DOCUMENTS

| | | | |
|---|---|---|---|
| 2,738,879 | 3/1956 | Franz | 210/239 |
| 3,308,956 | 3/1967 | Yeeet al. | 210/232 |
| 3,504,803 | 4/1970 | Brayman | 210/439 |
| 3,572,509 | 3/1971 | Dexter | 210/439 |
| 3,615,018 | 10/1971 | Johnson | 210/232 |
| 4,017,400 | 4/1977 | Schade | 210/439 |

FOREIGN PATENT DOCUMENTS 534420 12/1956 Canada ................................ 210/439

Primary Examiner—Bernard Nozick
Attorney, Agent, or Firm—John J. Leavitt

[57] ABSTRACT

Presented is an axial reverse flow by-pass filter assembly for fluids, such as lubricating oils and fuels, which cooperates with a full-flow filter to remove contaminants from lubricating oil and fuel. The filter assembly includes a base member cooperating with a cover member to enclose a filter element formed from a spirally wound roll of tissue paper. Oil or fuel is forced by the construction of the assembly to first flow upwardly through the central core of the filter element, then flow radially outwardly across the entire annular end of the roll of tissue paper, and then while being filtered, reverses its flow and flows downwardly between the plies of tissue paper and through a densely compacted zone of the tissue paper where even micro-sized solid contaminants are removed from the oil or fuel before it passes from the filter assembly.

18 Claims, 2 Drawing Sheets

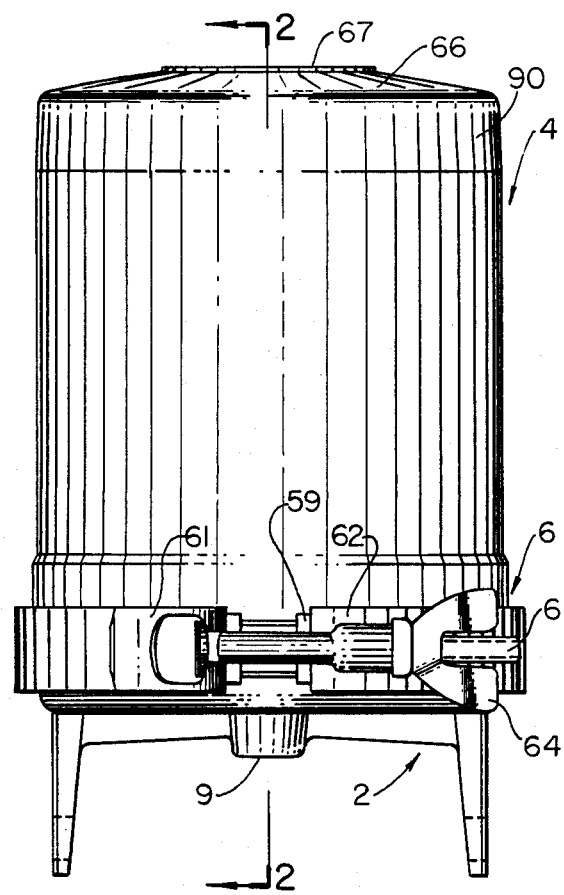
FIG. 1
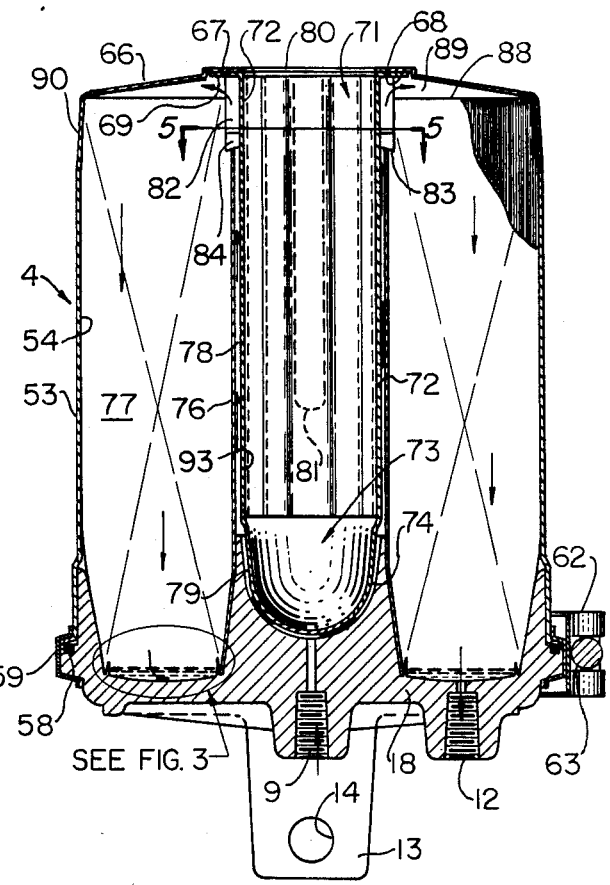
FIG. 2
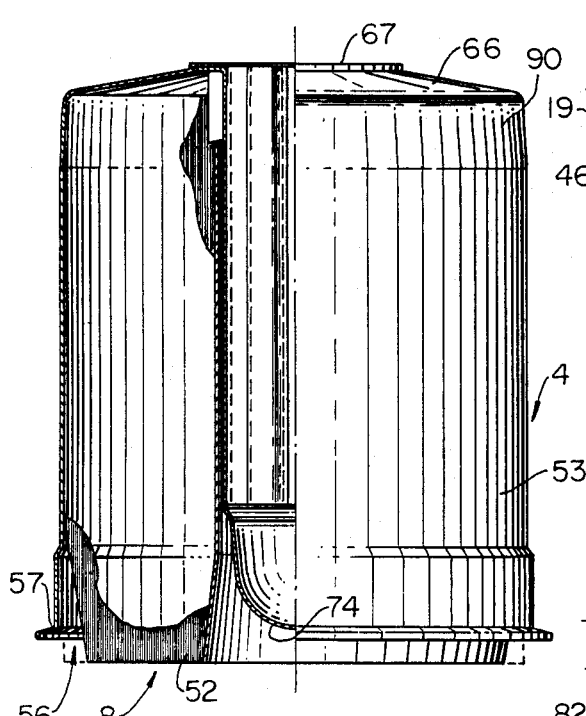
FIG. 4
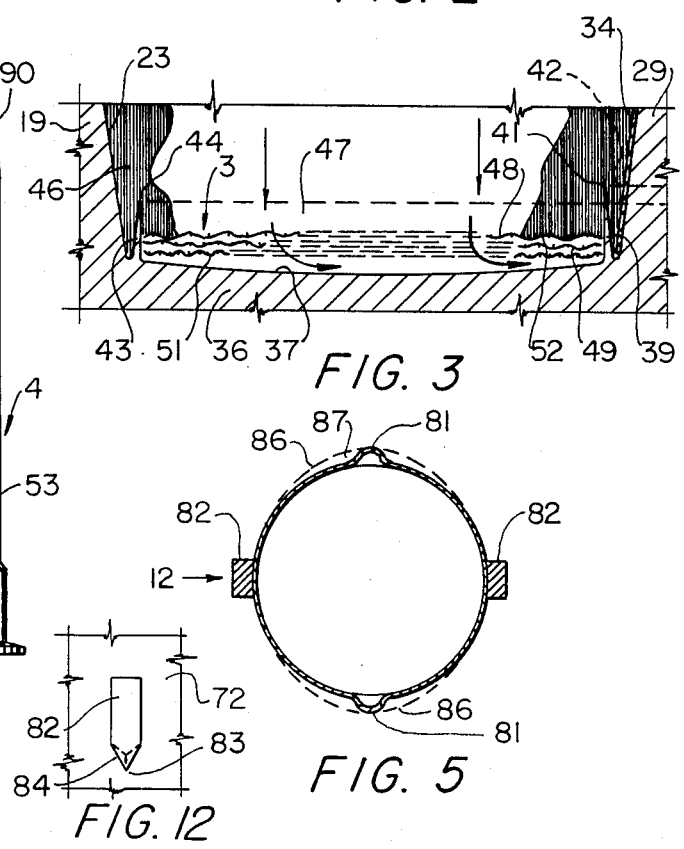
FIG. 3
FIG. 12
FIG. 5

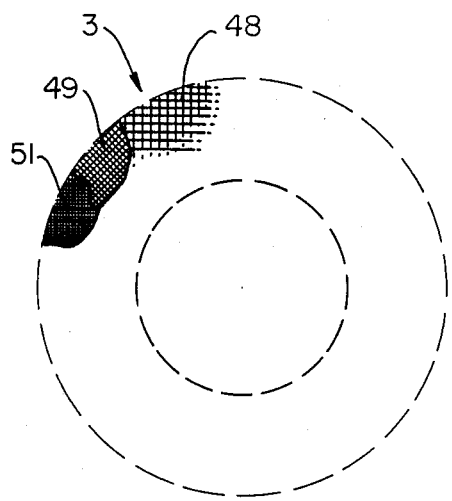
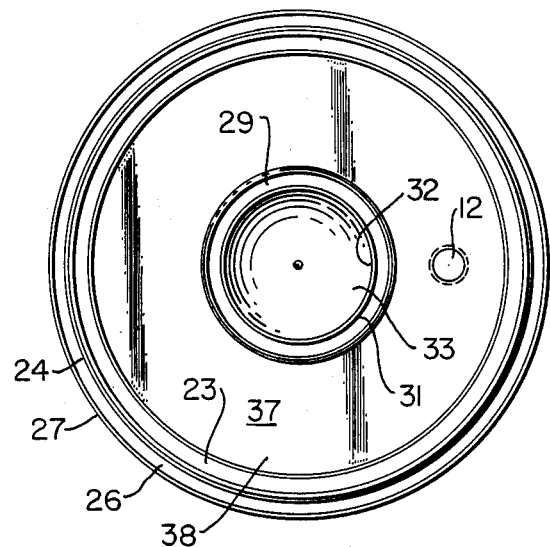
FIG. 6              FIG. 10
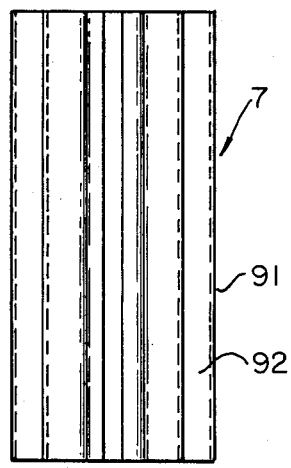
FIG. 7
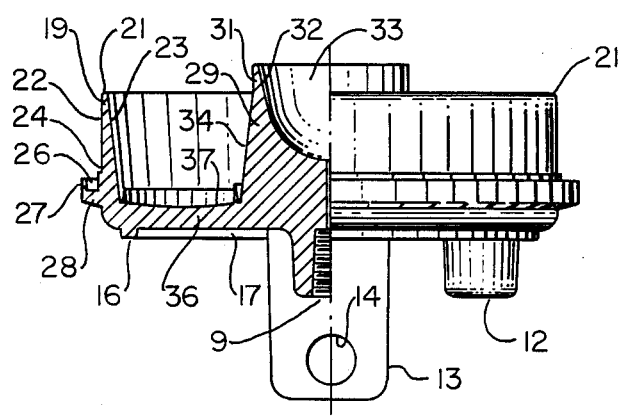
FIG. 9
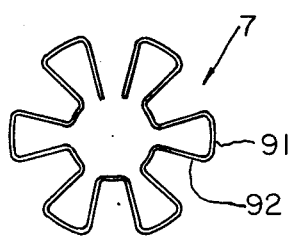
FIG. 8
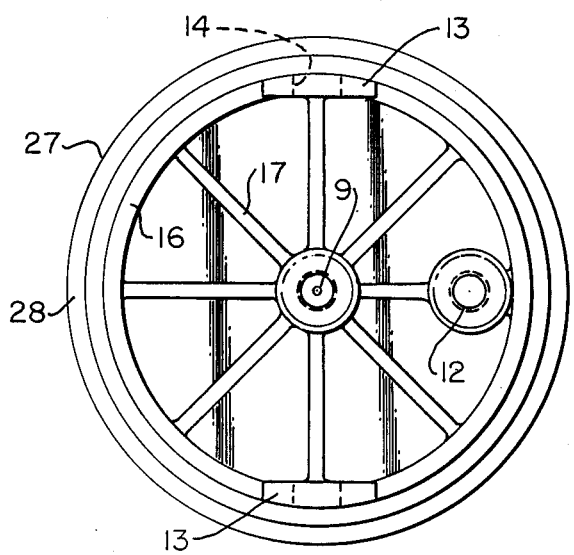
FIG. 11

AXIAL REVERSE FLOW FILTER ASSEMBLY FOR FLUIDS

BACKGROUND OF THE INVENTION

1. Field of the Invention

This invention relates to devices for filtering fluids such as lubricating and fuel oils, and more particularly to a filter assembly incorporating a spirally wound roll of tissue paper as a filtering element.

2. Description of the Prior Art

A preliminary patentability and novelty search in Class 210, sub-classes 494.1, 439 and 232 has revealed the existence of the following fourteen U.S. patents:

| | | |
|---|---|---|
| 2,661,846 | 2,928,547 | 3,308,956 |
| 3,317,053 | 3,481,478 | 3,487,942 |
| 3,504,803 | 3,526,590 | 3,868,325 |
| 3,872,008 | 3,912,631 | 3,975,273 |
| 4,454,036 | 2,738,879 | |

The useful life of an internal combustion engine is directly affected by the cleanliness of the lubricating oil utilized to prevent metal-to-metal contact between relatively moving metal parts. Lubricating oil contaminated with solid particulates such as dirt, sludge, and metal particles serves to transport such contaminants between relatively moving metal parts, where they act as an abrasive to cause premature and excessive wear of the parts.

In connection with oil-type fuels, such as diesel, it is important that entrained solids be filtered from the stream of fuel before the contaminating solids reach the fuel injectors, which might otherwise be clogged by solid contaminants.

In modern internal combustion engines, it is not uncommon for the engine to revolve at 3000 revolutions per minute (RPM) at cruise speeds, with engine RPMs of over 4000 and 5000 not being unusual. At these high RPMs, it is particularly important that the lubricating oil be kept clean and free of solid contaminants because the abrasive effect of the contaminants at these velocities is enhanced, thus causing excessive wear of the engine parts subjected to the abrasive action of the contaminated oil.

Since my initial invention of an oil filter device utilizing a conventional roll of toilet tissue as the filtering element, as illustrated and described in my previous U.S. Pat. No. 2,738,879 issued more than thirty years ago, and my subsequent invention as illustrated and described in U.S. Pat. No. 3,308,956 issued more than twenty years ago, many different structures have been invented, as exemplified by the prior art patents noted above, which utilize a roll of tissue paper as the filtering element. Each is different from the others in some particular novel respect, each attempting by some different mechanical means to solve the problems inherent in the use of a roll of tissue paper as the filtering element. In most instances, the roll of tissue paper is a roll of toilet tissue paper commercially available at a very low cost compared to other manufactured filter elements.

Thus, one of the characteristics of a roll of toilet tissue as a filtering element is that oil will not flow radially through the roll, i.e., transversely through successive plies. Oil will only flow axially through the roll, parallel to the plies. That being the case, since a conventional roll of toilet tissue is wound about an almost universally standard diameter paper core, and possesses a substantially universally standard outside diameter, it is clear that the effective cross-sectional area of the filter element is pre-determined by these factors. Accordingly, one of the important objects of my invention is to utilize a maximum amount of the effective cross-sectional filtering area of the roll while forcing all fluid to pass longitudinally parallel to the plies.

While filtering devices that utilize a roll of toilet tissue as the filtering element have become quite popular, the complaint that is heard most frequently from users is that changing the filter is a messy job. The complaint is not without merit when considered in relation to these type of filter units prior to the invention described herein. The reason lies in the fact that this problem has not heretofore been specifically addressed by manufacturers of the hardware. Accordingly, another object of the invention is the provision of a filter assembly for use with a roll of toilet tissue as a filter element which effectively eliminates the spilling of oil when the filter element is changed.

Through years of experience with engines, oil distribution systems, full-flow filters and by-pass filters such as the one forming the subject matter of the instant invention, I have become aware of many of the problems inherent in lubricating oil filtration systems for internal combustion engines. One of those problems arises from the fact that full-flow filters must be designed in such a manner that they accommodate oil flow even if the oil is dirty. In some full-flow filter assemblies a by-pass valve is included which opens when the filter element becomes clogged. In other full-flow filter assemblies, the construction of the filter element is such that it cannot be clogged. This is usually accomplished by controlling the density of the filter element so that it does not filter out or trap the fine impurities that are suspended in the lubricating oil. Accordingly, still another object of the invention is the provision of a by-pass type filter assembly which cooperates with the conventional oil filter of an internal combustion engine to eliminate from the oil stream the fine impurities that normally pass through conventional full-flow oil filters.

Another complaint frequently heard from users of the old style Frantz by-pass filter utilizing a roll of toilet tissue, such as the structures illustrated in U.S. Pat. Nos. 2,738,879 and 3,308,956, is that the filter element, namely, the roll of toilet tissue, is difficult to remove from the cannister because there is no easy way to grasp the oil-soaked filter unit. Accordingly, a still further object of the invention is the provision of an oil filter assembly in which provision is made to facilitate removal of the expended filter element when it becomes necessary to change the filter element.

At least one by-pass filter assembly on the market is referred to as a "spin-on" type. This means that after a base member is fixed in the engine compartment and appropriate hoses connected to the base member, a filter element permanently enclosed within a metal cannister is "spun on" the base member. To replace the filter element, the entire cannister is removed and discarded and a new cannister with a new filter element enclosed is purchased for about $12 retail and applied to the base member. From my experience, it appears that the $12 cost is prohibitive and constitutes an impediment to the sale of the unit even though it may be very effective in cleaning lubricating oil. Accordingly, a still further object of the invention is the provision of a filter assembly in which only the filter element per se need be changed, where the filter element is a roll of commercially available toilet tissue, and the cost of replacement of the filter element is orders of magnitude less than the cost of replacing the complete cannister.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the axial reverse flow filter assembly of the invention comprises a by-pass filter in the sense that it cooperates with the conventional full-flow oil filter of an internal combustion engine to receive and effectively clean about 10% of the flow of oil that passes through the full-flow filter, and then circulates the filtered 10% portion of oil back to the oil pan. In this way, the by-pass filter of this invention will filter all of the oil in a six-quart system in just over five (5) minutes at an engine speed equivalent to 45 miles per hour. The filter assembly includes a generally circular base member having mounting lugs on one side and inlet and outlet passageways that extend through the base to the opposite side of the base member. On such opposite side the base member is formed with an annular channel concentrically surrounding a centrally disposed axially extending boss the free end of which is formed with a spherical recess. The bottom of the channel is arcuate in a transverse radial direction, and screen means line the arcuate bottom wall of the annular channel. Seal members in the form of circular concentric knife-edges are provided associated with the inner and outer peripheral edges of the arcuate bottom wall. An integral seal flange surrounds the base member and with the base member defines an annular groove to receive an "O" ring, which cooperates with the open end of a cylindrical cover member in the form of a hollow shell that sealingly encloses the filter element, which comprises a spirally wound roll of conventional toilet tissue. Means are provided projecting from the closed end of the cover member to engage the central core of the filter element, and releasable means are provided to releasably lock in sealing relationship the base member and the cover member. Means are also provided mounted on the cover member to draw heat therefrom to thus reduce the temperature of the oil that passes therethrough.

BRIEF DESCRIPTION OF THE DRAWINGS

FIG. 1 is an elevational view of the assembled filter device apart from any supporting structure.

FIG. 2 is a vertical cross-sectional view taken centrally through the filter assembly of FIG. 1 in the plane indicated by the line 2—2 and in the direction indicated by the arrows.

FIG. 3 is an enlarged fragmentary cross-sectional view of the area of FIG. 2 encircled and indicated by the arrow 3.

FIG. 4 is an elevational view of the cover member with filter element inserted therein but apart from the base member. Portions of the structure are broken away to reveal the underlying structure.

FIG. 5 is an enlarged fragmentary cross-sectional view of the centrally disposed hollow boss taken in the plane indicated by the line 5—5 in FIG. 2.

FIG. 6 is a plan view of the screen means shown apart from the rest of the structure. Portions of the overlying screens are broken away to reveal the underlying screens.

FIG. 7 is an elevational view of the thermally conductive radiator means shown apart from the rest of the structure.

FIG. 8 is an end elevational view of the thermally conductive radiator means of FIG. 7.

FIG. 9 is an elevational view of the base member apart from the rest of the assembly, portions being broken away to reveal the internal construction.

FIG. 10 is a plan view of the base member illustrated in FIG. 9.

FIG. 11 is a bottom plan view of the base member illustrated in FIG. 9.

FIG. 12 is a fragmentary elevational view of a cutter member taken in the direction of the arrow 12 in FIG. 5.

DESCRIPTION OF THE PREFERRED EMBODIMENT

In terms of greater detail, the axial reverse flow lubricating oil and fuel filter assembly of the invention comprises a base member designated generally by the numeral 2, screen means 3 mounted on the base, a cover member 4 sealingly yet detachably mounted on the base member, a seal means 6 surrounding the union between the base member and the cover member to detachably secure these two members together, thermally conductive radiator fins. 7 detachably mounted on the cover member as illustrated, and a filter element 8 replaceably mounted within the cover member and on the base member in position to filter very fine micro-size particles of contaminants that may be held in suspension in the oil or fuel that passes therethrough.

Referring specifically to the base member 2, the base member is preferably diecast from aluminum alloy, has a generally circular configuration, and is provided with a centrally disposed inlet passageway 9 to which is adapted to be connected an appropriate hose or conduit carrying oil from the downstream side of the full flow filter conventionally used in connection with an internal combustion engine. The base member is also provided with an outlet passageway 12 that is radially displaced from the inlet passageway, and which cooperates therewith in a manner which will hereinafter be explained. The outlet passageway is connected by an appropriate tubing or conduit to the oil pan of an internal combustion engine wherein a reservoir of oil is maintained for lubricating the engine.

As indicated in FIG. 9, the inlet and outlet passageways are formed in axially extending integral bosses that are bored to provide a passageway from one side of the base member to the other, each of the bosses being bored and threaded as illustrated to accommodate an appropriate connection fitting (not shown). Also integrally formed on the same side of the base member as the axially projecting bosses within which are formed the inlet and outlet passageways, are a pair of axially extending and diametrically opposed mounting lugs 13, each having a mounting aperture 14 therein, useful for mounting the base member permanently in connection with an internal combustion engine. To strengthen the base member, and to provide resistance in the base member to warpage, the base member is provided with a circular rib 16 adjacent its outer periphery on the same side of the base member as the inlet and outlet bosses and the mounting lugs, and a plurality of radially extending integral ribs 17 connecting the circular rib 16 with the central boss within which the inlet passageway is formed. This construction is illustrated in FIGS. 1, 2, 9 and 11. The circular rib 16 and the radially extending ribs 17, are integral with the main body portion 18 of the base member and are formed on one side of that body.

Formed on the opposite side of the main body portion 18 of the base member is an axially extending circular flange 19 having an outer free end 21 and a cylindrical side wall 22 defining the outer periphery of the flange 19, and a tapered inner surface 23 as shown in FIG. 9. Formed on the cylindrical side wall 22 is a shoulder 24 annular in its configuration in that it extends all the way about the base member, and is associated with an annular trough 26 defined by a cylindrical flange 27 and a radially extending flange 28. This construction constituting the trough 26 and the flanges 27 and 28, is formed radially outwardly from the base of the cylindrical flange 19, and constitutes an integral part of the base member.

Centrally disposed on the main body portion 18 of the base member and extending axially in relation thereto, is a boss 29 the base of which lies in a common plane with a base of the flange 19, the boss extending axially beyond the top edge 21 of the flange 19, in a flange 31. The flange 31 is circular in its configuration, having a cylindrical outer wall and a tapered inner wall 32, the tapered inner wall 32 merging with a semi-spherical recess 33 formed in the free end of the boss 29. The semi-spherical recess 33 communicates with the inlet passageway 9 in such a manner that lubricating oil admitted to the filter assembly through the inlet passageway 9 enters the semi-spherical recess 33 in a manner which will hereinafter be explained with greater specificity.

Referring to FIGS. 3 and 9, it will be noted that while the flange 31 on the centrally disposed boss 29 is provided with a cylindrical outer surface, the inner surface 32 is tapered and merges with the semi-spherical interior of the recess 33. However, at the plane including the top edge 21 of the flange 19, the outer surface 34 of the boss 29 is tapered toward the main body portion 18, i.e., the tapered walls 23 and 34 converge toward the main body portion 18 where they are intercepted by a bottom wall 36 forming an integral part of the main body 18, the bottom wall 36 having an arcuate inner surface 37 as illustrated in FIGS. 3 and 9. The bottom surface 37 constitutes the bottom of the annular channel 38 formed by the integral flange 19 and the central boss 29, and more particularly by the tapered walls 23 and 34.

Again referring to FIGS. 3 and 9, where the tapered wall 34 of the central boss 29 intercepts the arcuate bottom wall 37 of the channel 38, there is provided a circular seal member 39 the base of which is integral with the arcuate surface 37, and slightly radially inwardly displaced from the base of the tapered wall 34 as shown. The circular seal member extends axially to provide a free knife-edge 41 that extends above the arcuate bottom wall surface 37 approximately 3/16 of an inch. For clarity, the view illustrated in FIG. 3 is enlarged in scale. The circular seal member 39 extends concentrically about the centrally disposed boss 29, and provides an annular space 42 between the knife-edge 41 and the associated surface of the tapered wall 34 for purposes which will hereinafter be explained.

In like manner, referring to the outer peripheral flange 19 and the tapered wall 23 thereof, where the tapered wall 23 intercepts the arcuate bottom wall surface 37 of the bottom wall 36, there is provided a second circular seal member 43 integral with the bottom wall 36 and extending axially therefrom to a circular knife-edge 44. It should be noted that the circular seal members 39 and 43 are generally formed with a cylindrical inner wall and a tapered outer wall, the tapered outer wall merging with the cylindrical inner wall at the knife-edges 41 and 44, respectively. With respect to the circular seal member 43, between the circular knife-edge 44 and the associated surface of the tapered wall 23 there is provided a space 46 similar to the space 42 between the circular knife-edge 41 and the associated surface of the tapered wall 34. It will thus be seen that the circular seal member 43 circumscribes concentrically the circular seal member 39 so that the cylindrical inner surfaces of the seal members essentially define an auxiliary annular channel 47 within the larger annular channel 38, both the annular channels 38 and 47 sharing the common arcuate bottom surface 37.

As illustrated in FIGS. 2 and 3, there is mounted within the auxiliary annular channel 47 disposed between the circular seal members 39 and 43 a plurality of screen means designated generally by the numeral 3. The screen means 3 are preferably multiple layers of contiguous metallic screens, preferably three in number, superposed one over another and differing in gauge, so that the more coarse grade screen 48 is contiguous to the end surface 52 of the tissue paper roll, the next below or intermediate screen 49 is of somewhat finer gauge, and is disposed between the lowermost annular screen 51 and the uppermost screen member 48 and is preferably of a finer gauge than the intermediate annular screen 49. Experience with the old style Frantz oil filter has taught that the pressure of the oil on the upper end of the roll of tissue paper causes the plies to elongate in the direction of the base, and unless prevented, the elongated plies abut against the smooth surface of the channel that is required to convey oil to the outlet passageway 12, restricting the passage of oil along the arcuate surface 37. Thus, the screen means described above, functions to prevent such elongation of the plies, and maintains the annular passageway beneath the end 52 of the roll of tissue paper clear and unobstructed for the free passage of oil thereabout and out of the outlet passageway 12.

Adapted to be detachably mounted on the base member 2 is the cover member designated generally by the numeral 4. The cover member comprises a cylindrical shell 53, preferably fabricated from an appropriate metal, such as steel or aluminum, but also possibly fabricated from an appropriate synthetic resinous material. The cylindrical shell is provided with an inner periphery 54 and a radially outwardly jogged cylindrical section 55 adjacent an open end 56 having a radially outwardly extending seal flange 57 thereon adapted to sealingly engage an "O" ring 58 disposed in the annular trough 26 when the jogged cover member section 55 is slipped snugly onto the outer periphery 22 of the flange 19 integrally formed on the base member 2. Because of the jogged section, the remainder of the inner cylindrical periphery 54 of the cover member 4 more snugly accommodates the roll of tissue paper, thus minimizing the tendency of oil to run down the outside of the roll.

With the detachable cover member 4 thus disposed on the base member 2, there is disposed over the union between the cover member 4 and the base member 2, an expandable and contractible compression and 59 that forms a part of the seal means designated generally by the numeral 6. The compression band 59 possesses a hat-shaped cross section which when contracted about the union between the cover member 4 and the base member 2, with the "O" ring disposed therebetween in the channel 26, causes the cover member 4 to be drawn down tightly upon the "O" ring and base member, thus forming a fluid-type seal at this union. To achieve this purpose, the seal band 59 is anchored at opposite ends to anchor members 61 and 62, which are in turn compressibly connected by a threaded spindle 63 working in cooperation with a wing-nut 64 rotatable on the threaded spindle to contract the compression band 59 about the union between the cover member 4 and the base member 2. This construction is illustrated in FIG. 1.

The cylindrical shell 53 is also provided with a closed end 66 having an annular offset portion 67 which forms an annular seat 68 for the radially extending flange 69 formed integrally on the open end of the tubular boss designated generally by the numeral 71 and having a cylindrical wall 72 that extends concentrically into the cylindrical shell 53 and terminates in a closed end portion designated generally by the numeral 73, and including a semi-spherical end wall 74. The semi-spherical end wall 74 is of lesser diameter than the cylindrical wall 72, as illustrated in FIG. 2, and the diameter of the cylindrical wall 72 is somewhat less than the diameter of the paper core 76 on which is spirally wound the tissue paper body 77 of the filter element 8. Because the diameter of the cylindrical wall 72 of the hollow boss 71 is less than the diameter of the core 76, there is provided between these two members an annular space 78 that communicates with the space 79 that exists between the semi-spherical end portion 74 of the tubular member 71 and the surface of the semi-spherical recess 33 formed in the centrally disposed boss 29. It will thus be seen that by seam welding or brazing the radially outwardly projecting flange 69 of the hollow boss 71 within the seat 68 of the offset portion 67 of the cover, there is formed a fluid-tight union at this juncture and adequate mechanical support between the hollow cylindrical shell 53 and the hollow and concentrically related hollow boss 71 the end of which next adjacent the closed end 66 of the shell 53 is open as indicated at 80.

Referring to FIGS. 2 and 5, it will be seen that elongated and diametrically opposed ribs 81 are formed in the elongated boss 71, the ribs 81 extending over half the length of the elongated boss 71 and projecting from the surface of the boss sufficiently to extend beyond the space 78 and to press against and to deform outwardly the central core 76 of the filter element 8. Also provided on the exterior cylindrical surface of the elongated tubular boss 71 are a pair of cutter members 82, the cutter members being positioned diametrically as indicated in FIGS. 2 and 5, with each of the cutter members having an elongated body that terminates at its lower end as illustrated in FIG. 12, in a knife-edge 83 formed by the converging sides 84 of the elongated cutter body as shown. The cutting members 82 are conveniently brazed or otherwise permanently secured to the outer cylindrical surface of the elongated tubular boss 71 and function to cut elongated slits (not shown) into the inner peripheral portion of the body 77 of the filter element 8, including the paper core thereof, when the filter element, being a roll of tissue paper, is inserted into the cylindrical shell 53 as illustrated in FIG. 2. The tapered sides 84 of the cutter element 82 function to aid the cutting operation, and also tend to separate the slit edges of the core 76 and associated plies of tissue paper, to thus provide associated with each cutter member, a pair of circumferentially spaced channels (not shown) through which oil may flow into the annular channel 78 as will hereinafter be explained.

The elongated ribs 81, as illustrated in FIG. 5, are preferably disposed in a plane that is perpendicular to a plane in which the cutter members are positioned, and the effect of pressing the body of the roll of tissue paper into the cylindrical shell 53 causes the distended portion 86 of the core (FIG. 5) to pull away from or to be spaced from the cylindrical surface of the elongated boss 71, thus providing elongated and parallel spaces 87 next adjacent the ribs through which oil may also pass either upwardly or downwardly for reasons which will hereinafter be explained.

With the body 77 of the roll of tissue paper inserted into the cylindrical shell 53 as illustrated in FIG. 2, it will be noted that the upper end 88 of the tissue roll is related to the closed end 66 in such a way that it provides an annular chamber 89 that communicates with the annular chamber 78 disposed between the outer periphery of the shell 72 and the inner periphery of the paper core 76, so that when oil is pumped into the inlet passageway 9, it enters the semi-spherical recess 33, passes upwardly through the annular chamber 78 and then flows into the annular chamber 89 and spreads across the top surface 88 of the roll of tissue paper. It is important to note that the oil that fills the chamber 89 is under pressure and will thus extend radially outwardly to include all of the plies of the roll of tissue paper. It is also important to note that the cover member 4, adjacent the closed end 66, is provided with an inwardly tapered wall section 90. This tapered wall section cooperates with the associated end portion of the roll of tissue paper to displace the outer plies of tissue paper radially inwardly, thus increasing the density of the end portion of the roll of tissue paper, and increasing the resistance to the passage of oil between the outer periphery of the roll of tissue paper and the inner periphery of the cover member since the outer periphery of the filter element will be jammed tightly against the convergent wall section 90 adjacent the end of the filter element. It will of course be understood that if oil under pressure is permitted to by-pass the filter element by flowing past the outer periphery of the roll of tissue paper, the cleaning efficiency of the filter element is compromised. Increasing the density at opposite ends of the filter element of a portion of the outer plies precludes oil from by-passing the filter element.

Thus, as the oil under pressure progresses downwardly parallel to the layers of spirally wound tissue paper, any entrained solid contaminants will be trapped between the layers of tissue paper, and any liquid contaminant, such as water, will be absorbed by the plies of tissue paper.

As the oil progresses downwardly between the plies of tissue paper, it eventually encounters that section of the roll of tissue paper that is encompassed within the channel 38 having the converging walls 23 and 34. In this area, the roll of tissue paper is more dense, the plies more closely compacted and thus form a greater restriction in this area to the passage of entrained micro-sized particles of solid contaminants. It should also be noted that while this section of the end portion of the roll of tissue paper is more densely compacted, the oil nevertheless will not pass radially between the plies, but will follow the convergent paths formed by the plies. As a result, particles of entrained solid contaminants that were not previously embedded in the roll of tissue paper, are here intercepted by the more densely packed plies of tissue paper so that the oil that emanates from the bottom end surface 52 of the tissue roll is free of entrained solid contaminants. Since the screen means 3 prevents the end 52 of the roll of tissue paper from contacting the arcuate surface 37 of bottom wall 36, it is clear that the annular channel formed between the seal members 39 and 43 provides an ample passageway for the now clean oil to pass to the outlet passageway 12, and returned to the oil pan.

One of the disadvantages of the old style Frantz oil filters noted above and represented by the two prior United States Frantz patents, is that changing the filter element constituted a messy procedure. This messy procedure, to the extent that it existed, resulted from the tendency of the filter assembly to retain free oil within its interior, i.e., oil that was not absorbed within the filter element per se, and which was then spilled when the filter element was extracted from the housing within which it was contained. One of the advantages of the structure disclosed herein is that as soon as the internal combustion engine is stopped, the flow of lubricating oil through the oil distribution system, including the filter assembly of this invention is also stopped, and positive pressure on the oil is removed. Any oil that remains in the chamber 89 adjacent the top 66 of the cover member and overlying the top surface 88 of the roll of tissue paper will either be absorbed into the tissue paper, or will immediately flow down the interior of the paper core 76 by virtue of the spaces that are provided alongside the rib members 81 and the cutter members 82. These spaces facilitate the flow of excess oil back into the recess 33 in the base member, where it is contained, and remains, when the cover member with filter element enclosed is lifted from the stationary base member 2.

This relationship of the parts is illustrated in FIG. 4. As there seen, after being mounted in the filter assembly for some time, and having had hot oil under pressure forced to flow through the filter element, the lower end of the filter element which normally is confined within the annular channel 38, remains conformed to the configuration of the channel 38 even after the cover member with filter element therein is removed from the base member. Thus, as illustrated in FIG. 4, the outer peripheral portion of the filter element that extends beyond the open end of the shell 53 tapers away from the inner periphery 54 of the shell. In like manner, referring to the inner peripheral surface of the roll of tissue paper, this surface portion of the end of the roll of tissue paper diverges as illustrated from the closed end 74 of the centrally located hollow boss 71, resulting in there being adequate space both adjacent the exterior periphery and adjacent the interior periphery of the expended filter element to easily grasp the projecting end of the roll of tissue paper between the thumb and forefinger, so as to extract the expended filter element from the enclosing cover member 4. If it happens that the filter element is tightly fitted within the encircling shell 53, the tapered cross-sectional portion of the filter element that projects beyond the end of the shell 53 may easily be grasped by the jaws of channel-lock pliers, or even conventional pliers, and only slight tension is required on the filter element to withdraw it from the cover member. Since all of the oil contained within the annular space 89 and within the annular passageway 78 that surrounds the central hollow boss 71 will have flowed or migrated into the semi-spherical recess 33, it is obvious that no free oil remains in the filter assembly to spill when the filter element is removed.

Another of the advantages of the present structure is that a maximum cross-section of the filter element is utilized to filter the oil, thus maximizing the capacity of the filter element. All of the plies of tissue paper are exposed to the oil contained in the end chamber 89, even those compacted by the tapered wall section 90, and all of the plies of tissue paper thus form passageways for the oil to flow downwardly. Since all of the plies of tissue paper at the lower end of the filter element are compressed by the converging walls 23 and 34 of the channel 38, it follows that only the very few plies of tissue paper caught outboard of the circular seal members 39 and 43 in the regions 42 and 46 are not utilized to convey oil into the annular auxiliary oil passageway defined between the seal members and the arcuate wall surface 37.

One of the factors that causes deterioration of lubricating oil in an internal combustion engine is excessive heat in such oil. To help alleviate this problem, the hollow interior of the centrally disposed boss 71 is provided with a thermally conductive radiator assembly 7. Referring to FIGS. 7 and 8, where this structure is illustrated apart from the remainder of the assembly, it is noted the radiator fin assembly is formed from a single length of sheet material, preferably a highly thermally conductive material such as aluminum or copper, and that this elongated metallic material is formed in such a manner as to provide fins 91 arranged in a generally circular configuration, the outer peripheral surface of which is in contiguous thermally conductive contact with the inner periphery of the shell 72, while each of the fins 91 is provided with lateral surfaces 92 that are exposed to the ambient atmosphere. Thus, air circulating through the open end of the hollow boss 71 by convection draws heat from the radiator fins, which in turn draw heat from the metallic shell 72 with the exterior surface of which the oil is in intimate heat transfer relation.

It will thus be seen that a filter assembly is provided that is economical to manufacture, which utilizes a filter element that is orders of magnitude less expensive than filter elements permanently enclosed within "spin-on" cannisters, and which is easy to remove and replace with a new filter element when the previous filter element has become expended through use. Additionally, means have been disclosed for drawing heat from the oil that passes through the filter assembly to thus to some extent reduce the over-all operating temperature of the oil and the internal combustion engine equipped with my filter assembly.

Having thus described the invention, what is believed to be new and novel, and sought to be protected by Letters Patent of the United States is as follows.

I claim:

1. An axial reverse flow filter housing assembly adapted to removably receive therein a spirally wound filter element for filtering fluids, comprising:
    (a) a base (2) having inlet (9) and outlet (12) passageways therein for said fluids, said outlet passageway including an annular channel (38) on one side of said base (2) having an annular bottom wall (37), said inlet passageway channeling fluids initially axially and then transversely to pass over one end

(88) of said spirally wound filter element (8) remote from said annular channel (38) whereby said inlet passageway connects with said annular channel (38) only through said filter element (8) when said filter element (8) is removably mounted in said housing assembly, and said outlet passageway (12) connects directly with said annular channel (38) through said annular bottom wall (37);

(b) screen means (3) mounted on said base member (2) and disposed in said annular channel (38) adjacent said bottom wall (37);

(c) cover means (4) detachably mounted sealingly on said base member (2) enclosing said annular channel (38) and adapted to sealingly enclose said removable filter element (8) when disposed therewithin; and (d) a hollow elongated boss (71) mounted on said cover means and adapted to extend into said filter element and engage the inner periphery thereof when a filter element is mounted in said housing assembly.

2. The combination according to claim 1, in which said annular channel (38 is provided with inner (39) and outer (43) peripheral walls that converge toward said bottom wall (37), and an end portion (52) of said removable filter element when removably mounted in said housing assembly extends into said annular channel (38) and is compressed to increase the density of said end portion (52) of a filter element (8) extending into said annular channel (38).

3. The combination according to claim 1, in which an outer peripheral rim flange (19) on the base member (2) defines the outer periphery of said annular channel (38), a centrally disposed boss (29) on said base member (2) coaxially arranged with respect to said outer peripheral rim flange (19) and constituting the inner periphery of said annular channel (38), and a semi-spherical recess (33) formed on the free end of said boss (29) and communicating with said inlet passageway (9).

4. The combination according to claim 1, in which a first circular seal member (39) having a knife-edge is provided within said annular channel (38) adjacent the inner periphery of said annular bottom wall (37) of said channel, and a second circular seal member (43) having a knife-edge (44) concentric with said first circular seal member (39) is provided adjacent the outer periphery of said annular bottom wall (37).

5. The combination according to claim 1, in which lugs (13) are provided on said base member (2) on the side thereof opposite said annular channel (38) for mounting the filter housing assembly on a supporting structure.

6. The combination according to claim 1, in which said boss (71) on said cover means (4) is cylindrical, and ribs (81) are provided on said boss (71) adapted to frictionally engage the inner periphery of said filter element (8).

7. The combination according to claim 1, in which said boss (71) on said cover means (4) is cylindrical, and means (82) are provided on said boss (71) adapted to penetrate the inner periphery of said filter element (8) when said filter element (8) is inserted into said cover means (4) to form a channel (87) for fluid between the outer periphery of said boss (71) and the inner periphery of the filter element (8).

8. The combination according to claim 1, in which means (58) are provided for sealingly detachably mounting said cover means (4) on said base member (2).

9. The combination according to claim 1, in which a filter element (8) is mounted on said base member (2) and includes an end portion (52) extending into said annular channel (38) continuous with said screen means (3) and sealingly enclosed within said cover means (2) whereby fluid admitted through said inlet passageway (9) must axially traverse said filter element before exiting from said outlet passageway (12).

10. An axial reverse flow filter housing assembly adapted to removably receive therein a spirally wound filter element for filtering fluids, comprising:

(a) a base (2) having inlet (9) and outlet (12) passageways therein for said fluids, said outlet passageway including an annular channel (38) on one side of said base (2) having an annular bottom wall (37), said inlet passageway channeling fluids initially axially and then transversely to pass over one end (88) of said spirally wound filter element (8) remote from said annular channel (38) whereby said inlet passageway connects with said annular channel (38) only through said filter element (8) when said filter element (8) is removably mounted in said housing assembly, and said outlet passageway (12) connects directly with said annular channel (38) through said annular bottom wall (37);

(b) screen means (3) mounted on said base member (2) and disposed in said annular channel (38) adjacent said bottom wall (37);

(c) cover means (4) detachably mounted sealingly on said base member (2) enclosing said annular channel (38) and adapted to sealingly enclose said removable filter element (8) when disposed therewithin;

(d) an outer peripheral rim flange (19) on the base member (2) defining the outer periphery of said annular channel (38);

(e) a centrally disposed boss (29) on said base member (2) coaxially arranged with respect to said outer peripheral rim flange (19) and constituting the inner periphery of said annular channel (38); and (f) a semi-spherical recess (33) formed on the free end of said boss (29) and communicating with said inlet passageway (9);

(g) said cover means (4) provided with a centrally disposed hollow boss (71) the free end (73) of which is semi-spherical (74) and projects into said semi-spherical recess (33) of said centrally disposed boss (29) on said base member (2) when said cover means (4) is mounted on said base member (2).

11. An axial reverse flow filter housing assembly adapted to removably receive therein a spirally wound filter element for filtering fluids, comprising:

(a) a base (2) having inlet (9) and outlet (12) passageways therein for said fluids, said outlet passageway including an annular channel (38) on one side of said base (2) having an annular bottom wall (37), said inlet passageway channeling fluids initially axially and then transversely to pass over one end (88) of said spirally wound filter element (8) remote from said annular channel (38) whereby said inlet passageway connects with said annular channel (38) only through said filter element (8) when said filter element (8) is removably mounted in said housing assembly, and said outlet passageway (12) connects directly with said annular channel (38) through said annular bottom wall (37);

(b) screen means (3) mounted on said base member (2) and disposed in said annular channel (38) adjacent said bottom wall (37);

(c) cover means (4) detachably mounted sealingly on said base member (2) enclosing said annular channel (38) and adapted to sealingly enclose said removable filter element (8) when disposed therewithin;

(d) said cover means (4) including a cylindrical shell (53) symmetrical about a longitudinal axis and open at one end (56) and closed at the other end (66); and (e) a tubular cylindrical boss (71) having a closed end (73) extending concentrically into said shell (53) toward the open end (56) thereof and an open end (80) mounted on the closed end (66) of said cylindrical shell (53) whereby the interior of said tubular cylindrical boss (71) is open to the ambient atmosphere.

12. The combination according to claim 11, in which thermal radiator means (7) are mounted within the hollow interior of said tubular cylindrical boss (71) in contiguous thermally conductive contact therewith.

13. An axial reverse flow filter housing assembly adapted to removably receive therein a spirally wound filter element for filtering fluids, comprising:

(a) a base (2) having inlet (9) and outlet (12) passageways therein for said fluids, said outlet passageway including an annular channel (38) on one side of said base (2) having an annular bottom wall (37), said inlet passageway channeling fluids initially axially and then transversely to pass over one end (88) of said spirally wound filter element (8) remote from said annular channel (38) whereby said inlet passageway connects with said annular channel (38) only through said filter element (8) when said filter element (8) is removably mounted in said housing assembly, and said outlet passageway (12) connects directly with said annular channel (38) through said annular bottom wall (37);

(b) screen means (3) mounted on said base member (2) and disposed in said annular channel (38) adjacent said bottom wall (37);

(c) cover means (4) detachably mounted sealingly on said base member (2) enclosing said annular channel (38) and adapted to sealingly enclose said removable filter element (8) when disposed therewithin;

(d) a filter element (8) mounted on said base member (2) and including an end portion (52) extending into said annular channel (38) contiguous with said screen means (3) and sealingly enclosed within said cover means (2) whereby fluid admitted through said inlet passageway (9) must axially traverse said filter element before exiting from said outlet passageway (12);

(e) said filter element (8) being spirally wrapped about a tubular core (76), and (f) a tubular cylindrical boss (71) provided on said cover means (4) projecting concentrically into said tubular core (76) of said filter element (8);

(g) said filter element (8) occupying the annular space between the outer periphery of said tubular cylindrical boss (71) and the inner periphery of said cover means (4) whereby fluid under pressure admitted through said inlet passageway (9) passes upwardly between the outer periphery of said tubular cylindrical boss (71) and the inner periphery of said tubular core (76) and spreads radially outwardly to flow downwardly between the plies of said spirally wrapped filter element (8) and into said annular channel (38) and said outlet passageway (12).

14. An axial reverse flow filter housing assembly adapted to removably receive therein a spirally wound filter element for filtering fluids, comprising:

(a) a base (2) having inlet (9) and outlet (12) passageways therein for said fluids, said outlet passageway including an annular channel (38) on one side of said base (2) having an annular bottom wall (37), said inlet passageway channeling fluids initially axially and then transversely to pass over one end (88) of said spirally wound filter element (8) remote from said annular channel (38) whereby said inlet passageway connects with said annular channel (38) only through said filter element (8) when said filter element (8) is removably mounted in said housing assembly, and said outlet passageway (12) connects directly with said annular channel (38) through said annular bottom wall (37);

(b) screen means (3) mounted on said base member (2) and disposed in said annular channel (38) adjacent said bottom wall (77);

(c) cover means (4) detachably mounted sealingly on said base member (2) enclosing said annular channel (38) and adapted to sealingly enclose said removable filter element (8) when disposed therewithin;

(d) a first circular seal member (39) having a knife-edge provided within said annular channel (38) adjacent the inner periphery of said annular bottom wall (37) of said channel;

(e) a second circular seal member (43) having a knife-edge (44) concentric with said first circular seal member (39) provided adjacent the outer periphery of said annular bottom wall (37);

(f) said cover means (4) provided with a centrally disposed hollow boss (71) the free end (73) of which is semi-spherical and projects into said semi-spherical recess (33) of said centrally disposed boss (29) on said base member (2) when said cover means (4) is mounted on said base member (2);

(g) a spirally wound roll of tissue paper (77) having an inner and an outer periphery, said inner periphery surrounding said centrally disposed boss (71) and said outer periphery concentrically disposed within said cover means (4), one end (88) of said roll of tissue paper (77) abutting one end (66) of said cover means (4) and the other end (52) of said roll of tissue paper (77) abutting said screen means (3), the end portion (52) of said roll of tissue paper (77) contiguous with said screen means (3) being compressed into said annular channel (38) to increase the density thereof; and (h) said first circular seal member (39) having a knife-edge sealingly embedded in the end (52) of said roll of tissue paper (77) closely adjacent the inner periphery thereof while said second circular seal member (43) ha a knife-edge (44) sealingly embedded in the end (52) of said roll of tissue paper (77) closely adjacent the outer periphery thereof;

(i) said semi-spherical recesses (33) in said centrally disposed boss (29) on said base member (2) communicates with said inlet passageway (9), (j) said annular channel (38) in said base member communicates with said outlet passageway (12), whereby fluid under pressure admitted through said inlet passageway (9) passes upwardly between said centrally disposed hollow boss (71) on said cover means (4) and the inner periphery of said spirally wound roll of tissue paper (77) and spreads radially across the top thereof and then passes downwardly between the spirally wound plies thereof and passes through said condensed end portion between said first (39) and second (43) seal members and into said channel (38) and thence through said outlet passageway (12).

15. The combination according to claim 14, in which said spirally wound roll of tissue paper (77) is provided with a tubular core (76), and said centrally disposed boss (71) on said cover means (4) is provided with longitudinally extending rib means (81) frictionally engaging the inner periphery of said tubular core (76).

16. The combination according to claim 14, in which said cover means (4) includes a cylindrical shell (53) symmetrical about a longitudinal axis and open at one end (56) and closed at the other end (66), and said centrally disposed boss (71) on said cover means (4) comprises a cylindrical tube (72) having a closed end (73) extending concentrically into said cylindrical shell (53) toward the open end (56) thereof and an open end (80) mounted on the closed end (66) of said cylindrical shell (53), whereby the interior of said cylindrical tube (72) is open to the ambient atmosphere.

17. The combination according to claim 16, in which means (82 are provided on said centrally disposed tubular boss (71) adjacent the open end (80) thereof adapted to penetrate the inner periphery of said roll of tissue paper (77) when said roll of tissue paper (77) is inserted into said cylindrical shell (53) whereby to form a channel (87) for fluid between the outer periphery of said centrally disposed tubular boss (71) and the inner periphery of said roll of tissue paper (77).

18. The combination according to claim 17, in which thermal radiator means (7) are mounted within the tubular interior of said tubular boss (71) in contiguous thermally conductive contact therewith whereby to provide thermally conductive vanes exposed to the ambient atmosphere to draw off heat by conduction from the fluid passing through said filter assembly and dissipating such heat by convection to the ambient atmosphere.

* * * * *